United States Patent [19]

Cerf

[11] 3,895,618
[45] July 22, 1975

[54] DIFFERENTIAL FUEL SUPPLY SYSTEM FOR INTERNAL COMBUSTION ENGINES

[75] Inventor: Peter H. Cerf, Edina, Minn.

[73] Assignee: Anton Braun, Minneapolis, Minn.

[22] Filed: June 28, 1973

[21] Appl. No.: 374,380

[52] U.S. Cl. ............ 123/127; 123/32 F; 123/32 ST; 123/140 R
[51] Int. Cl.² ........................................ F02M 13/06
[58] Field of Search .......... 123/27, 127, 32 ST, 32.6

[56] References Cited
UNITED STATES PATENTS

| | | | |
|---|---|---|---|
| 1,271,942 | 7/1918 | Ricardo | 123/32 ST |
| 2,123,522 | 7/1938 | Bryan | 123/27 |
| 2,221,405 | 11/1940 | Nallinger | 123/32.6 |
| 2,489,405 | 11/1949 | Doyle | 123/127 |
| 2,562,511 | 7/1951 | Schowalter | 127/27 GE |
| 2,599,680 | 6/1952 | Weeks | 123/119 R |
| 2,928,382 | 3/1960 | Hug | 123/27 GE |
| 3,753,424 | 8/1973 | Haidvogel | 123/27 GE |

OTHER PUBLICATIONS

"Fumigation Kills Smoke, Improves Diesel Performance," Alperstein et al., SAE Transactions, Vol. 66, 1958.

Primary Examiner—Charles J. Myhre
Assistant Examiner—James D. Liles
Attorney, Agent, or Firm—Dorsey, Marquart, Windhorst, West and Halladay

[57] ABSTRACT

A method for improving the performance of a diesel engine wherein the fuel supply is introduced into the engine by two different means, and apparatus to practice the invention. Fuel is supplied to the engine through a conventional injection nozzle. In addition, an optimum portion of the fuel is supplied through an auxiliary fuel supply apparatus. The portion supplied through the auxiliary fuel supply apparatus is metered according to the speed of or load on or a combination of the speed of and load on the diesel engine and is introduced into the diesel engine in a finely atomized or vaporized state.

2 Claims, 4 Drawing Figures

PATENTED JUL 22 1975  3,895,618
SHEET 1
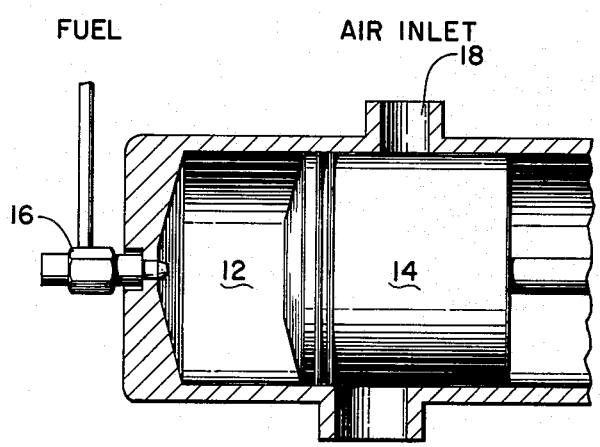
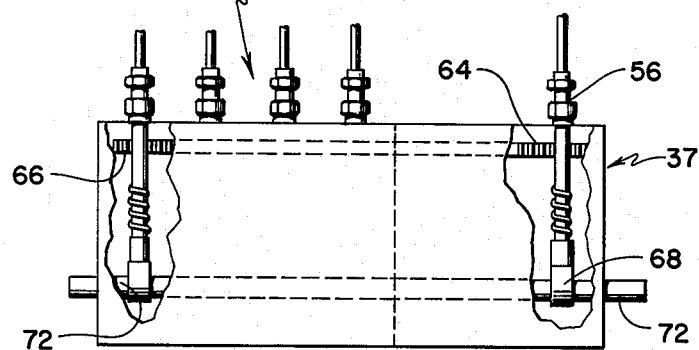
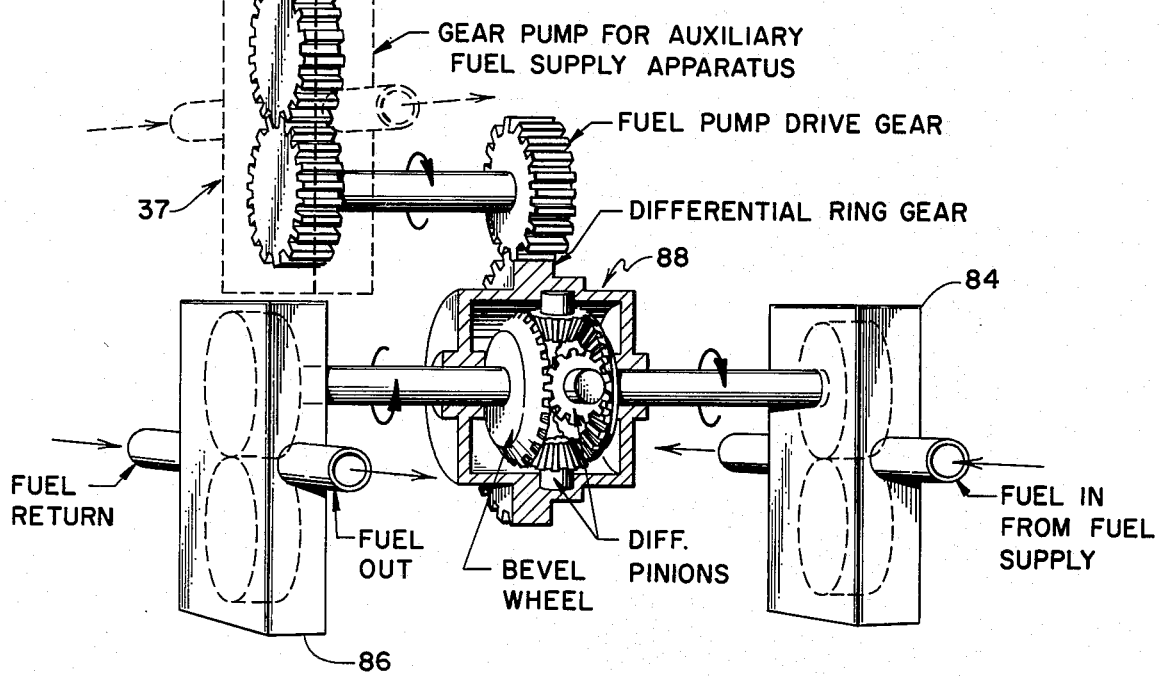

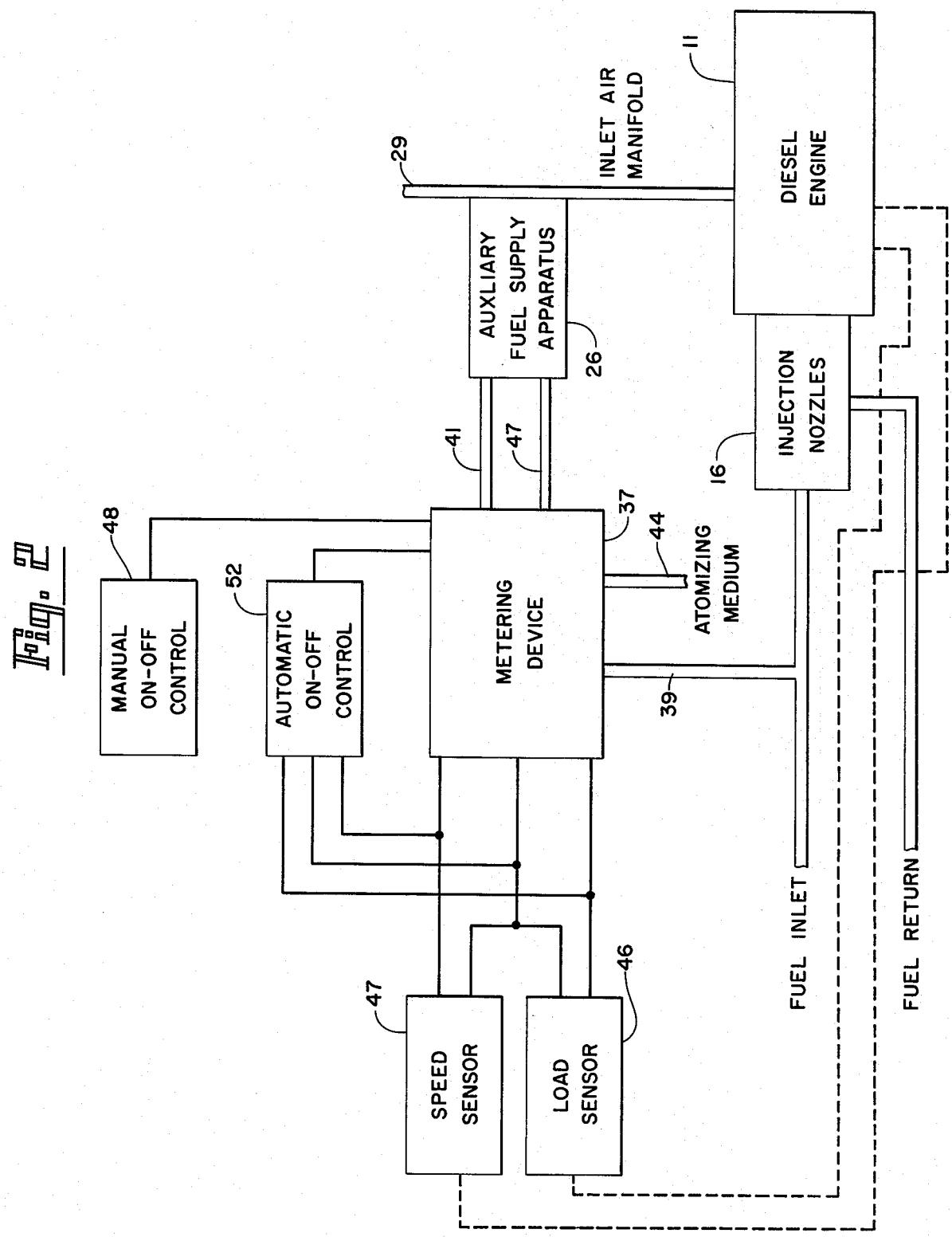

DIFFERENTIAL FUEL SUPPLY SYSTEM FOR INTERNAL COMBUSTION ENGINES

BACKGROUND OF THE INVENTION

Combustion processes in a conventional gasoline engine and a conventional diesel engine differ in the following significant features: In the gasoline engine a vaporized gasoline-and-air mixture is drawn into the cylinder, compressed (compression ratios range roughly between 4:1 and 10:1) and ignited by a spark. In the diesel engine, on the other hand, air alone is drawn into the cylinder and is compressed to a much higher compression ratio (between 10:1 and 25:1) than in the gasoline engine. As a result of this high compression, the air is heated to a temperature higher than the ignition temperature of the fuel. Only then is a certain quantity of diesel fuel injected into the cylinder. Because of the prevailing high temperature, the fuel ignites. This is referred to as compression ignition.

However, combustion in the diesel engine does not take place immediately when the fuel particles enter the combustion chamber, but after an interval on the order of milliseconds. This is because the fuel droplets first have to mix intimately with the air in the combustion chamber and must then be heated and vaporized before they can burn or effect other phenomena such as pre-combustion chemical activities. The time that elapses between injection and ignition is called the ignition lag. Generally, shorter ignition lag results in smaller rates of pressure rise during combustion and smoother burning and lower maximum cylinder pressure.

When injecting fuel into the diesel engine, it is broken up by an injection nozzle into smaller and larger droplets according to a certain pattern. Normally, smaller droplets occur more particularly in the edge zone of the injected fuel spray and are the first to ignite. Next, the larger droplets in the interior of the spray are ignited. Fuel injection continues after the first flame is formed (main combustion).

In conventional diesel engines with direct injection the fuel is injected directly into the cylinder. The injection nozzle must be designed so that its spray pervades all the air in the combustion chamber so that a maximum amount of fuel can be burned with a minimum air requirement. A stoichiometric mixture, or optimized air to fuel mixture ratio pervading the entire volume of the combustion chamber, is currently more closely approached in the conventional gasoline engine where mixture residence time is longer than in the conventional diesel engine.

The combustion process and the economical operation and efficiency of diesel engines depends to a large extent, on the quality of vaporization of the fuel. The cause of after-burning is frequently unsuitable vaporization or insufficient mixing of the fuel with the air.

Approaches in the past to alter the basic diesel engine by altering fuel injection have been mainly directed to modifying the diesel engine to enable it to burn lower grade fuel by increasing the air-fuel mixing capability of the engine. Two such modifications are the swirl chamber and the pre-combustion chamber. In the swirl chamber air is forced into a preliminary chamber by the engine piston and thereby acquires a rapid swirling motion so that mixing with the fuel is promoted. In a pre-combustion chamber fuel and air are mixed and preliminary combustion takes place. As a result of the rise in pressure during pre-combustion, the incompletely burned fuel and gas mixture flows at high velocity from the pre-combustion chamber into the cylinder, where it undergoes complete combustion with the air therein.

Secondary injection of fuel has also been attempted in the past, perhaps most notably by the German Air Force, who developed "R Fluid" during World War II. However, the major purpose of pre-injection in the past also appears to have been to inject a high quality fuel so that lower quality fuel, which could not be compression ignited by itself, is ignited, thereby creating an engine capable of utilizing lower grade fuels. Consequently, a dual fuel supply and system was necessary.

SUMMARY OF THE INVENTION

Applicant's invention is a process which is uniquely designed to improve the operating performance of a diesel engine. The specific objects of applicant's invention are to increase power output, to reduce smoke emissions, to reduce fuel consumption, to decrease the ignition lag, to lower the rate of pressure rise and to lower the maximum cylinder pressure. Also, through reduced ignition lag and lower peak pressure, timing can be retarded and thus nitrogen oxide emissions may be reduced. To accomplish these results the present invention atomizes an amount of fuel less than that which will compression ignite and introduces it into the engine prior to injecting fuel with the usual fuel injection nozzles. In addition, for practical application, this process and design requires only one fuel supply as distinguished from two separate fuel supplies required in the dual-fuel engines utilized, for example, in the German design.

An optimum amount of fuel which is to be introduced through the auxiliary fuel supply apparatus is metered for optimum performance throughout the load and speed range of the engine. This fuel is atomized into the inlet air of the diesel engine in an amount less than compression ignition density. Fuel is then injected into the combustion chambers of the cylinders in the usual fashion and with the usual injection equipment after compression ignition temperature has been reached. As a result of the preliminary atomization and vaporization of fuel with the inlet air, a more stoichiometric air-fuel mixture throughout the volume of the combustion chambers is obtained in the diesel engine at the time of combustion.

The specific design disclosed for my process enables control of the amount of fuel introduced by metering the fuel to be supplied to the auxiliary fuel supply apparatus according to speed, load, or a combination of speed and load, each of which is advantageous for specific purposes. Alternatively, the auxiliary fuel supply apparatus may be automatically or manually controlled and energized at either a pre-set percentage of the fuel to be supplied to the fuel injection nozzles or the metering device may be selectively energized according to the same operating conditions indicated above.

DESCRIPTION OF THE DRAWINGS

FIG. 1 is a schematic representation partly in section of a basic diesel engine;

FIG. 2 is a schematic flow diagram showing the major components which can be utilized to practice my invention.

FIG. 3 is one example of a condition sensing and metering device which may be utilized to practice my invention.

FIG. 4 is an alternative example of a condition sensing and metering device which may be utilized to practice my invention.

DESCRIPTION OF THE PREFERRED EMBODIMENT

FIG. 1 shows the basic principals of one cylinder of a conventional diesel engine 11 having a combustion chamber 12, a piston 14, a fuel injection nozzle 16 and an air inlet 18. Fuel is supplied to the fuel injection nozzle from a fuel supply (not shown). Air from the air inlet 18 is normally pressurized by means of the piston 14 so that when fuel is injected through the injection nozzle 16, it compression ignites to initiate combustion to create power output of the engine 11.

Referring to FIG. 2, apparatus suitable to practice the method of my invention includes an auxiliary fuel supply apparatus 26 secured to the air inlet manifold 29 for introducing atomized fuel into the air inlet manifold 29 which thus introduces it into the combustion chambers 12 of the diesel engine 11. The auxiliary fuel supply apparatus 26 preferably atomizes or vaporizes the fuel during introduction. The mixture of air and atomized fuel, which is at an air-to-fuel mixture ratio less than that which will compression ignite, is introduced into the combustion chamber 12 in its mixed state. As is conventionally done, fuel is then injected into the pressurized mixture in the combustion chamber 12 initiating ignition. A more nearly stoichiometric mixture is thus created in all areas of the combustion volume upon injection of the main fuel.

Fuel is supplied to the auxiliary fuel supply apparatus 26 through a metering device 37 which may be preset at a fixed percentage of the fuel to be supplied to the fuel injection nozzles or which may be set to meter fuel in response to the operating conditions of the engine such as fuel consumed, air flow, fuel pressure, exhaust temperature, speed or load. In each instance the amount of fuel supplied should be less than that which will compression ignite when pressurized. In addition to the fuel inlet 39 and outlet 41 of the metering device 37 which supplies the fuel supply apparatus 26, there is preferably an inlet 44 and outlet 47 for an atomizing medium.

The atomizing medium should be suitable to atomize the fuel in the fuel supply apparatus 26 so that it is introduced into the air intake manifold 29 as a fine mist or in a vaporized state. This can be accomplished with air atomization, sonic atomization with the use of air, electrically with a piezo-electric atomizer, and the like.

Attached to the metering device 37 may be one of four or all four controls 46, 47, 48 and 52 shown in FIG. 2. Three modes of operation are contemplated: selected intermittent manual or automatic control designated 48 and 52 respectively, at a metered rate or at a specific percentage of the fuel or air otherwise reaching the cylinders, and direct metering over the full range of speed and load of the engine by the metering device 37 which meters the amount of fuel to be supplied to the auxiliary fuel supply apparatus according to the speed of or load on the engine 11 or a combination thereof.

The manual on-off control 48 may be a simple electrical switch which opens and closes solenoid valves to cause, for example, 20% of the fuel supply to be supplied through the metering device 37 to the auxiliary fuel supply apparatus 26. A manual cut-in and cut-out can then be made by the diesel engine operator at high speed or high load conditions when an increase in power or efficiency or smoke reduction is desired to required.

Similarly, the automatic on-off control 52 may be set to operate in the same manner as the manual on-off control 48. Actuation or energization of the automatic on-off control 52, however, is preferably controlled by either a speed-sensing device 47 such as a tachometer or air flow sensing device, or a load-sensing device 46 such as a torque sensing or fuel flow measurement type apparatus, depending on the use and purpose for which the improved performance is desired for the diesel engine 11. The automatic on and off control 52 may also be governed by a combination of speed and load, as shown in FIG. 2.

The metering device 37 meters or varies the amount of fuel to be supplied to the auxiliary fuel supply apparatus 26 according to the specific speed of or load on the diesel engine 11. It should be understood that the mode of operation and the selection of which sensor 46 or 47 or whether both sensors 46 and 47 will control the metering device 37 or the automatic on-off control 52 may be accomplished with a simple relay system and control board (not shown).

Metering as well as the manual and automatic controls 48, 52 are advantageous in a practical system in that the auxiliary fuel supply apparatus 26 requires a power input and, at low speeds or loads of the diesel engine 11, the power required to operate the auxiliary equipment is proportionately larger in relation to the power output of the diesel engine 11 at high speeds or large loads. Also, under specific conditions, auxiliary fuel supply may be undesirable. Thus, the selectively actuatable control devices disclosed for use in my process increase and optimize performance of a diesel engine.

Shown in FIGS. 3 and 4 are two devices which demonstrate the principles of my invention. It should be understood that they are exemplary only and that I intend other devices which utilize the principles of my invention to be covered hereby.

In FIG. 3 a metering device 37 is constructed which meters fuel to the auxiliary fuel supply apparatus according to the load on and speed of the engine. A single cylinder injection pump 56 is secured to the engine 11 in an operative position relative to the standard fuel injection pump 58 conventionally used with a diesel engine.

The fuel inlet pipe (not shown) for the single cylinder injection pump 56 should be connected to the fuel supply 58 in the same manner as the connections for the standard injection pump 56. A rack extension 64 is secured to the rack 66 of the injection pump 58 and a suitable cam 68 is fixed to the cam shaft 72.

While shown as an auxiliary single cylinder injection pump 56, it should be obvious that any suitable variable displacement pump may be used including a conventional multi-cylinder pump with the outlet of one cylinder being used to supply the auxiliary fuel supply apparatus 26.

The load sensing device 46 is connected to the rack 66 which controls the amount of fuel which is passed through the cylinder upon each stroke of the cylinder and the speed sensing device 47 is the cam shaft 72, the speed of which is always proportional to the engine 11 speed, which drives the piston of the auxiliary injection pump 56. Since fuel is supplied to the auxiliary fuel supply apparatus 26 through the single cylinder injection pump 56 in direct proportion to the fuel injected through the fuel injection nozzles 16 by the standard injection pump 58, an optimum ratio of fuel supplied to the auxiliary fuel supply apparatus 26 relative to fuel injected can be maintained over the full range of speed and load on the engine 11.

It should be noted that the apparatus of FIG. 3 may be dependent only on speed with use of the cam 68 without the rack extension 64 and presetting the piston position for a fixed amount. In addition, the apparatus may be selectively energized by locating, for example, a solenoid valve (not shown) in the fuel inlet line.

An alternative embodiment to achieve the purpose of my invention is shown in FIG. 4. As with the device shown in FIG. 3, the flow meter of FIG. 4 maintains an optimum ratio between fuel supplied through the auxiliary fuel supply apparatus 26 and fuel injected through the injection nozzles 16.

Flow meters 84, 86 are rotatably secured in the fuel inlet and fuel return lines of the diesel engine 11. In a mechanical version these are coupled to a differential gear train 88 to the metering device 37 which delivers fuel to the auxiliary fuel supply apparatus 26 according to the differential flow between the inlet and return lines or according to the fuel actually consumed by the engine 11. It should be obvious that differential flow can also be sensed and utilized to control a metering device 37 electronically, hydraulically or pneumatically and each is within the intendment of my invention.

In a device as disclosed above, since the amount of fuel consumed depends upon the speed and load of the diesel engine, an optimum amount of fuel can be supplied to the auxiliary fuel apparatus 26 which is precisely dependent on the operating conditions of the engine.

In some fuel supply systems the fuel supply pressure is directly proportional to the engine speed. To practice my invention in such a system a fixed orifice in the metering device 37 could be utilized to furnish fuel to the auxiliary fuel supply apparatus 26 in proportion to speed, while a variable orifice activated by the load control of the engine could be utilized to adjust fuel flow to the prevailing load condition.

Similarly, air flow can be sensed as a representation of engine speed, and exhaust temperature can be sensed as an indication of load.

In general, while I have described specific embodiments of my invention, it is to be understood that this is for purposes of illustration only and that various modifications can be made within the scope of my invention. It should be particularly noted that while this disclosure discusses conventional diesel engines in combination with the apparatus disclosed there is no intention to limit the application to prior art diesel engines. The apparatus disclosed is designed to be compatible with newly developed engines which are compression ignited and thus fall generically within the definition of "diesel engines."

I claim as my invention.

1. A differential fuel supply system for internal combustion engines comprising in combination:

a diesel engine having a combustion chamber, an injection nozzle, an air supply, a fuel supply and an auxiliary fuel supply apparatus connected to the air supply of the engine at a point remote from the injection nozzle;

means for determining the speed of and load on the engine including means for determining the rate of fuel flow to the engine; and means controlled by the speed and load determining means for supplying a portion of the fuel to the auxiliary fuel supply apparatus which is varied according to the speed of and load on the engine.

2. The differential fuel supply system of claim 1 wherein said fuel supply has inlet and return lines and said means for determining the rate of fuel flow comprises:

flow meters operatively positioned to sense flow in the inlet and return lines of the fuel supply;

differential means operatively associated with the flow meters to determine the difference in flow between the fuel inlet and return lines; and wherein said means for supplying a portion of the fuel to the auxiliary fuel supply apparatus comprises a positive displacement pump operatively connected to the differential means to be responsive to the difference in flow.

* * * * *